United States Patent

[11] 3,569,967

| [72] | Inventors | Robert Jules Gendreu;<br>Jean Andre Lemoing; Guy Francis Le Parquier, Paris, France |
|---|---|---|
| [21] | Appl. No. | 781,885 |
| [22] | Filed | Dec. 6, 1968 |
| [45] | Patented | Mar. 9, 1971 |
| [73] | Assignee | Thomson C.S.F.<br>Paris, France |
| [32] | Priority | Dec. 13, 1967 |
| [33] | | France |
| [31] | | 132,111 |

[54] ECHO PROCESSING APPARATUS OF SIDE LOOKING DETECTION SYSTEMS OPERATING WITH FREQUENCY MODULATED TRANSMITTED PULSES
6 Claims, 10 Drawing Figs.

| [52] | U.S. Cl. | 343/17.2 |
|---|---|---|
| [51] | Int. Cl. | G01s 7/28 |
| [50] | Field of Search | 343/17.2, 17.2 (PC), 12, 14, 17 |

[56] References Cited
UNITED STATES PATENTS

| 3,165,741 | 1/1965 | Thor | 343/17.2 |
|---|---|---|---|
| 3,212,087 | 10/1965 | Blass et al. | 343/17.2UX |
| 3,271,765 | 9/1966 | Pulford | 343/17.2UX |
| 3,427,105 | 2/1969 | Ingalls | 343/17X |
| 3,461,420 | 8/1969 | Silverman | 343/17X |

Primary Examiner—Rodney D. Bennett
Assistant Examiner—Joseph G. Baxter
Attorney—Cushman, Darby and Cushman ABSTRACT: In a moving side-looking coherent detection system, wherein the transmitted pulses are linearly frequency modulated, the echoes are submitted to a compression which is a function of the range of the target from which they originate, and by means of which the recording of the echoes on a photographic film displaced at a speed proportional to that of the system, supplies, for each echo, a pattern similar to that of a Newton ring; the observation of that pattern with a coherent and plane luminous wave and an appropriate conventional optical system allows the direct vision of the position of the target.

PATENTED MAR 9 1971 3,569,967

ECHO PROCESSING APPARATUS OF SIDE LOOKING DETECTION SYSTEMS OPERATING WITH FREQUENCY MODULATED TRANSMITTED PULSES

The present invention relates to moving detection systems, in particular airborne radar systems designed for ground surveillance functions, of the "side-looking" type and especially to those of the frequency-modulated pulse type in which the received signals consist of pulses initially linearly modulated in frequency, as a function of time, and subsequently modulated by the Doppler effect.

These systems are generally associated with a moving camera for recording the echoes after proper treatment thereof, the film speed being proportional to the vehicle speed and the echo being recorded after compression and coherent detection is a well known manner. The information recorded is of such a nature that the use of an optical correlator is necessary for its analysis, the weight and size of which are such that the procession of the information cannot always be carried out on board of the vehicle.

The invention has for its object to supply the recorded information is in such a form that it may be processed on board.

According to the invention there is provided a coherent liner liner linearly frequency-modulated pulse detection system of the type comprising distance gates, a phase detection device coupled to said gates and having a output, scope means coupled to sad said output and synchronized with the distance gates, and means for recording the scope luminous signals on a moving film, wherein respective compression filters are respectively inserted between said gates and said phase detection device, the compression rate of each filter having a predetermined algebraic value which is a function of the range of the distance gate to which it is coupled.

For a better understanding of the invention and to show how the same may be carried into effect, reference will be made to the drawing accompanying the following description and in which:

FIGS. 1, 2, 3a, 3b, and 3c, are aimed at recalling the fundamental characteristics of a side locking antenna detection system with pulse compression;

In the following, for the sake of clarity, the invention will be described in the case of a radar detection system; but it is to be understood that it is by no means limited to that kind of pulse detection system, for example it may be used with sonar detection systems.

Figure 1:
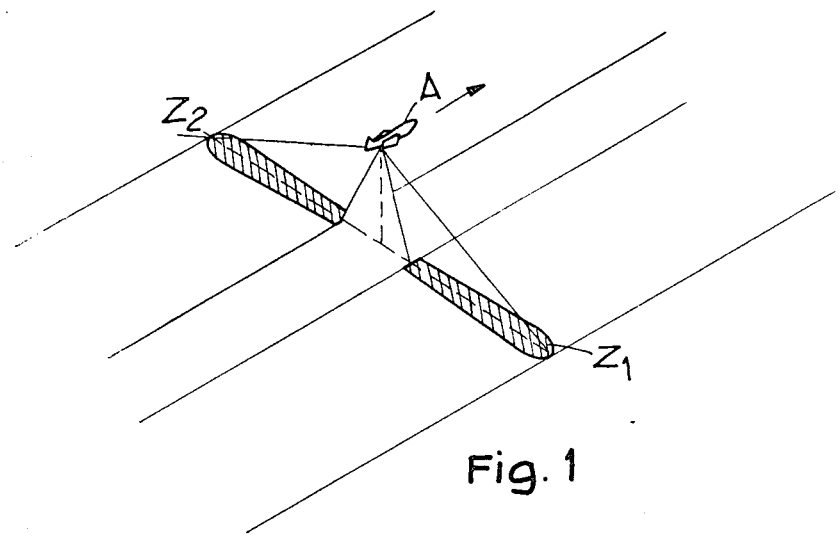

For ground observation purposes, the aircraft A of FIG. 1 is equipped with a radar system having at least one lateral or side-looking antenna. In the case illustrated, there are two antennae, for ground observation on both sides of the aircraft flight path.

The zones $Z_1$ and $Z_2$ covered by the radar in a given position of the aircraft, have been hatched. Of course, each zone is observed independently.

Figure 2:
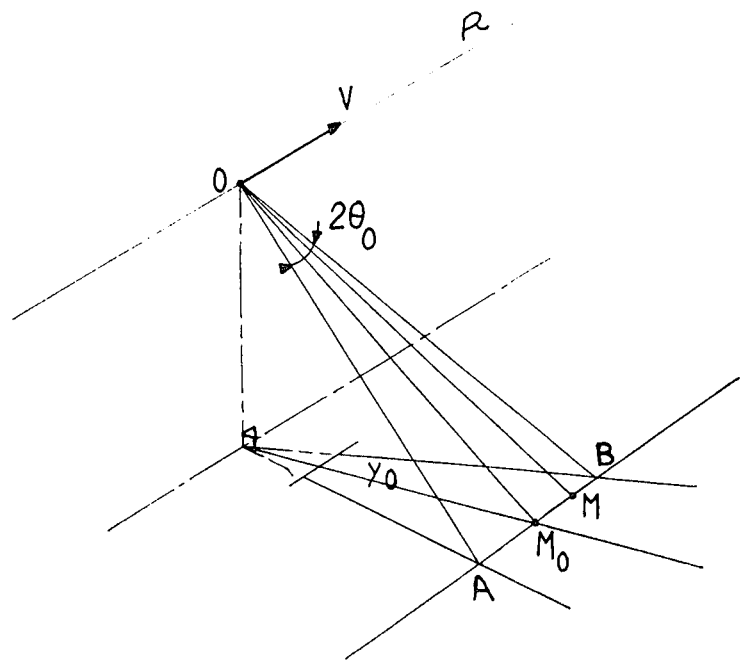

FIG. 2 illustrates on a enlarged scale a part of FIG. 1. The point 0 illustrates the origin of the beam, with and aperture angle $2\Theta_0$ defining a trace A B on the ground. It will be assumed that the aircraft is flying the horizontal flight path R at a constant speed V. The situation is exactly the same if the aircraft is considered to be motionless and the observed zone to be moving; $M_0$ and $M$ thus represent two successive post positions of a point in relation to the aircraft.

A point is scanned during the time interval $$T = \frac{2\Theta_0 Y_0}{V}$$

where $Y_0 = OM_0$.

The radar equipment used is of the coherent type, that is to say it incorporates means for measuring the relative phase $\Phi$ of a received echo relatively to a wave in phase with the transmitted signal; during the displacement of the aircraft, the variation of this relative phase $\Phi$ represents the variations of the distance $Y = OM$. At the instant at which the first derivative of this phase, with respect to time, i.e. the "Doppler frequency" reaches zero, the target is located on the normal to the velocity vector (position $M_0$) of the aircraft. It can be shown that the phase difference $\Phi$ between the relative phase $\Phi$ of the echo reflected by the target in the M position and the relative phase $\Phi_0$ of the echo reflected in the $M_0$ position is very nearly of the form $\Phi = -\Delta t^2$, $\Delta t$ designating the time interval necessary for the a target to pass from the M 0 to the M position and $k$ being equal to $2\pi V^2 / \lambda Y_0$, $\lambda$ being the operating wavelength. Disregarding a constant (the relative phase $\Phi_0$ in $M_0$) and assuming that the antenna gain is constant within the beam ($2\Theta_0$), the output signal produced by the radar phase detector equipment during the time it sweeps the target, is a signal of duration T, having the form E cos $k \Delta t^2$ with $\Delta t$ varying from $-T/2$ to $+T/2$: in fact, the signal obtained is the envelope of the sampled signal of amplitude E.

Figure 3A:
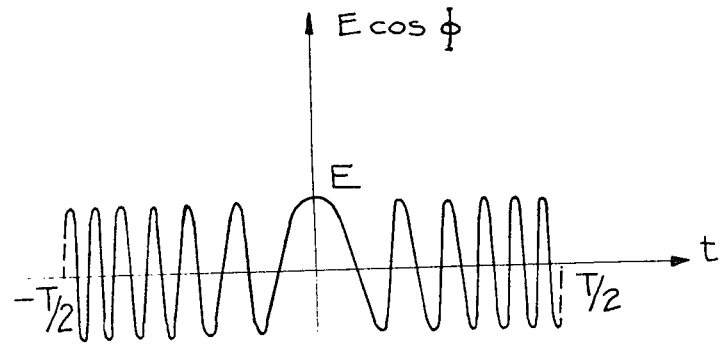
Figure 3B:
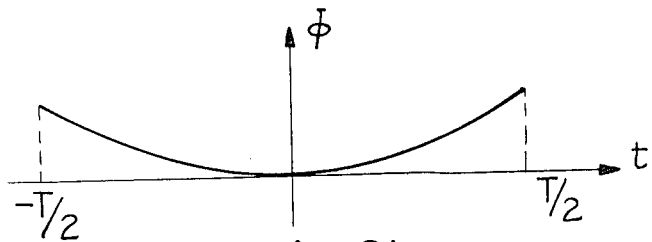
Figure 3C:
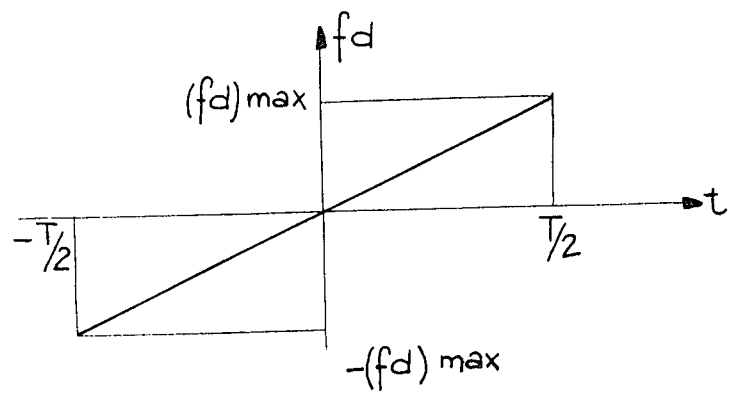

The curve of FIG. 3a represents the envelope of the signal E cos $\Phi$, assuming the initial phase $\Phi_0$ to be zero, that is to say $Y_0$ to be a multiple of $\lambda /2$. The curves of FIGS. 3b and 3c respectively illustrate the phase $\Phi$ and the Doppler frequency $$fd = \frac{1}{2\pi} \times \frac{d\Phi}{dt}$$

of the signal, as a function of time; the latter frequency is a linear function of time and has a maximum when the target is located at the edges of the beam (direction 0A and 0B of FIG. 2).

The indication of the position of the target in the direction perpendicular to the flight path of the aircraft, is supplied by the determination of the duration of the transmission-reception time, provided that the received echo is very short or can be made so, which is the case in the pulse-compression type radar equipment. The transmitted signal is then a pulse of duration $T_1$ linearly modulated in frequency.

The corresponding received echo is translated to a lower frequency and compressed in a suitable compression filter, which yields a corresponding short pulse $e$, by means of which the distance of the target, and therefore the position of the target in the direction perpendicular to the flight path of the aircraft, the altitude of which is known, is determined.

The width of this short pulse determines the absolute precision of this measurement.

These remains to determine the location of the target in the direction of the flight path.

After suitable filtering and detecting in a phase-amplitude detector, which is also supplied with a reference wave in phase with the original pulse from which the long transmitted pulse was derived, each short pulse gives rise to a signal $e_1$ of the form $e_1 + J \cos \Phi$, where $J$ represents a short pulse. The pulses $e_1$ thus obtained form the signals to be recorded.

To this end, a cathode-ray tube with a horizontal scanning system along a direction referred to as the Y-direction, synchronized by the repetition frequency synchronization system of the the radar equipment, is used.

The spot image is formed on a film which is moving in a direction X, perpendicular to the Y-direction, at a speed proportional to the speed of the aircraft A.

After developing, the various spots corresponding to a given target occupy on the film a strip having the in the Y-direction a width defined by the duration of the short pulse and a length $2\Theta_0 Y_0$ in the X-direction, disregarding the proportionality factors. The transparency of this strip along an axis parallel to the OX-direction varies substantially as a function of cos $\Phi$. An optical correlation is used to determine the position of the target along a parallel to the path of flight.

All what precedes is well known to those skilled in the art concerned and need not be further described, the invention being concerned with a different echo processing apparatus still using a recorder system with a moving film but the input signals of which have been processed differently, thanks to which the need for an optical correlator is eliminated.

Figure 4A:
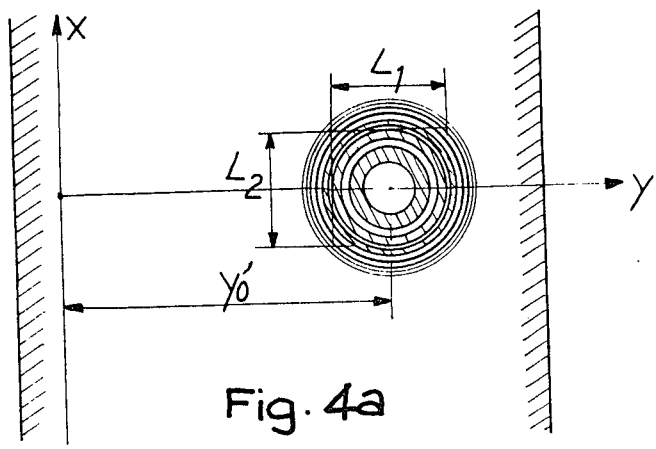
FIGS. 4a, 4b, 5a and 5b are explanatory diagrams.

The system according to the invention will be explained with reference to FIG. 4a schematically showing a film recorder of the above-mentioned type but used according to the invention. For each target, a system of two coordinate axes X and Y, respectively parallel to the above defined X-/ and Y- directions, are considered. In this coordinate system the coordinates will be referred to as X' and Y' to distinguish them from the corresponding real magnitudes $$X = X' \frac{V}{v}, Y = Y' \frac{c}{2s}$$

where $v$ is the speed of the film motion, and $s$ the velocity of the scanning spot. Those axes are tied to the film and a intersect at a point of origin such that the coordinate X' is zero for a spot derived from an echo reflected by the corresponding target while in the $M_0$ position, while the coordinate Y' is $$Y'_0 = \frac{2s}{0} Y_0$$

(or $Y'_0$ minus a constant for this same spot.

When the considered target varies, the axis X slides on itself while the axis Y which is fixed relatively to the scanning scope moves relatively to the film.

The system according to the invention has its origin in the fact noted by the Applicants, that is if the echoes are not compressed before they are applied to the amplitude phase detector, the transparency signals, relative to one and the same target appearing on the film will no longer he grouped within narrow strips of varying transparency in the X-direction, but will form concentric equitransparency curves of the second degree, centered on a point of coordinate X' = 0 and Y' = Y'$_0$, and thus will determine both the distance $Y_0$, and the origin of the axes, i.e. the location of the target along a parallel to the path of flight of the aircraft and this in a way which may be easily visualized either directly or using an intermediate vehicle of the information.

This may be shown as follows:

The transmitted signal is a pulse of duration $T_1$, linearly modulated in frequency of the form:

$S = H(t) \cos[2\pi(F_0 + f_0)t + \beta_1 t^2)]$ where $F_0$ is a constant high frequency;

$f_0$ is a constant intermediate frequency;

$\beta_1$ is a constant characterizing the linear frequency modulation;

$H(t)$ is a function which is equal to 1 during the duration $T_1$ of the transmitted pulse, and to zero outside this time interval.

After translation to the intermediate frequency $f_0$ by means of the reference wave at frequency $F_0$, the corresponding echo, assuming the gain of the anta antenna to be constant within the angular width 2 $Y_0$ $\Theta_0$, and disregarding a phase angle which is a constant for a given target, has the following form:

$S_1 = H(t-_p) \cos[2\pi f_0 t + \beta_1(t-t)^2 - \ ]$ where $t_p$ is equal to twice the propagation time of the transmitted pulse from the radar to the target M.

After weighting and detecting in the phase detector, receiving on the other hand the reference wave at the frequency $f_0$, this gives rise to the signal which will be recorded, i.e. still disregarding a phase angle which is a constant for a given target $S_2 = H(t-_p) \cos[\beta_1(t-t)^2 - \Phi]$
$= H(t-_p) \cos[\beta_1(t-t)^2 - kt^2]$.

In this expression $(t-t_p)$ may be considered as equal to $t-t_{p_0}$, and consequently to $(Y' - Y'_0)/s$, where $Y'_0 = s\,t_{p_0}$.

The transparency of the film at the spot of coordinate X' and Y' of the region occupied by the echoes of a given target will consequently be determined by the value of $$\cos\left[\beta_1 \frac{(Y' - Y_0')^2}{s^2} + k\frac{X'^2}{v^2}\right]$$

This transparency will therefore be a constant along the curves $$\beta_1 = \left(\frac{Y' - Y_0'}{s^2}\right)^2 + k\frac{X'^2}{v^2} = \text{constant}$$

which curves will be circles if $\beta_1/s = k/v^2$ where $k$ is equal to $$\frac{2\pi V^2}{\lambda Y_0}$$

Assuming this to be the case, the recording, illustrated in FIG. 4a, is identical to a Newton ring; in this FIG., , $L_1 = s\,T_t$ and $$L_2 = 2\theta_0 Y_0 \frac{V}{V}$$

the portions of the circles outside the area thus defined do not correspond to echoes of the considered target.

In fact this is the case only for a given value $Y_{ol}$ of $Y_0$.

As the to the a targets at a range different from $Y_{ol}$, the echo before being detected will have to be compressed or expanded in a ratio depending upon the value of $Y_0/Y_{01}$: in the expression $S_1$ of the echo signal a at the input of the phase detector, a coefficient $\beta\beta'_1$ will then be substituted to coefficient $\beta_1$, $\beta'_1$ being defined by $$\frac{\beta_1}{\beta_1} = \frac{Y_{01}}{Y_0}$$

This condition being met, for each target a Newton ring will appear on the film.

Figure 4B:
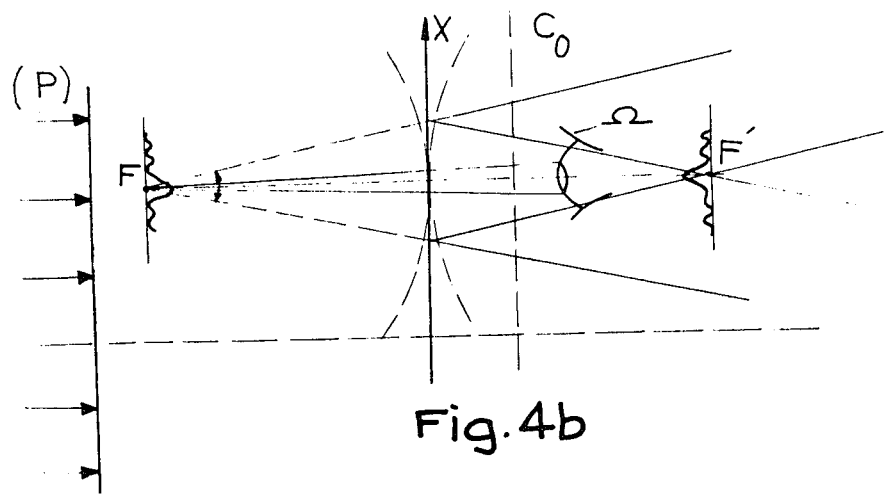

Whereas the definition of the position of the target on the basis of the strip representing an echo, in the conventional recording method hereinbefore described, requires the use of an optical correlator to define the X coordinate, the "rings" which represent the echoes in the recording method of the present invention (assuming the echoes to have been subjected to a suitable compression which is a function of the range of the target) can be analyzed directly by the observer's eye; all that is required in this context is to illuminate the film as illustrated in FIG. 4b, using a plane monochromatic light waver P. This wave, passing through the film, gives rise, for each spot, i.e. for each target, to the three following waves:

a plane wave, the plane of which is represented by $C_0$;

a divergent spherical wave with a virtual focus F; and

AC a convergent spherical wave with a real focus F'. It is more practical to use the virtual foci F. In this case, the convergent waves and the plane waves $C_0$ disturb the eye of the observer located at Ω and arrangement has to be provided to ensure that the eye sees only the foci F.

The radar system illustrated in FIG. 6, whose operation will be explained also referring to FIGS. 5a and 5b, comprises an arrangement corresponding to this embodiment. The radar system comprises a side-looking antenna having an optical analyzing arrangement in accordance with the present invention. The transmitter and receiver are not different from those of a conventional radar equipment of the kind used for optical correlation, and have therefore been illustrated only in a highly schematic way, only those elements of these parts which are essential to the description of the present invention, having been shown. A basic oscillator 61 operates at the intermediate frequency $f_0$ and produces the reference wave which, in the transmitter, is frequency-modulated in the long pulse generator 62, including a dispersive filter, this generator being synchronized by the general synchronizing system 63. This wave also constitutes the reference wave for the phase detection process described hereinafter.

The output pulses from the generator 62, at the intermediate frequency $f_0$, and the echoes, having the frequency $F = f_0 + F_0$, picked up by the antenna. And, are respectively translated to the frequencies $F$ and $f_0$ in the respective adding and subtracting mixers, 64 and 65, which receive the ultrahigh frequency reference wave (frequency $F_0$) from the oscillator 66.

A duplexer tube 67 is placed between the antenna and the two mixers 64 and 65.

The conventional amplifier circuits have not been illustrated to simplify the FIG.; at the output of the mixer 65, the echoes appear at the intermediate frequency in the form of long pulses, which are frequency-modulated, and affected by the Doppler effect.

In accordance with the invention, the pulses are applied to a processing circuit TR comprising $n$ variable-ratio compression filters, for effecting the above-mentioned compression or expansion of the received intermediate frequencies echoes according to the values of $Y_0$. To simplify matters, only the term compression will be used henceforth, it being assumed that the compression ratio may be greater or less than unity. In this latter case (ratio less than 1) the filter in fact carries out an expansion. It is well known that the same filter can be used to produce compression of a specific pulse, and expansion of the same pulse but reversed as a function of the time, a variety of procedures (inverted recording and readout, additive and subtractive mixing) being known in order to bring about the thus-defined "inversion" of a pulse.

Figure 6:
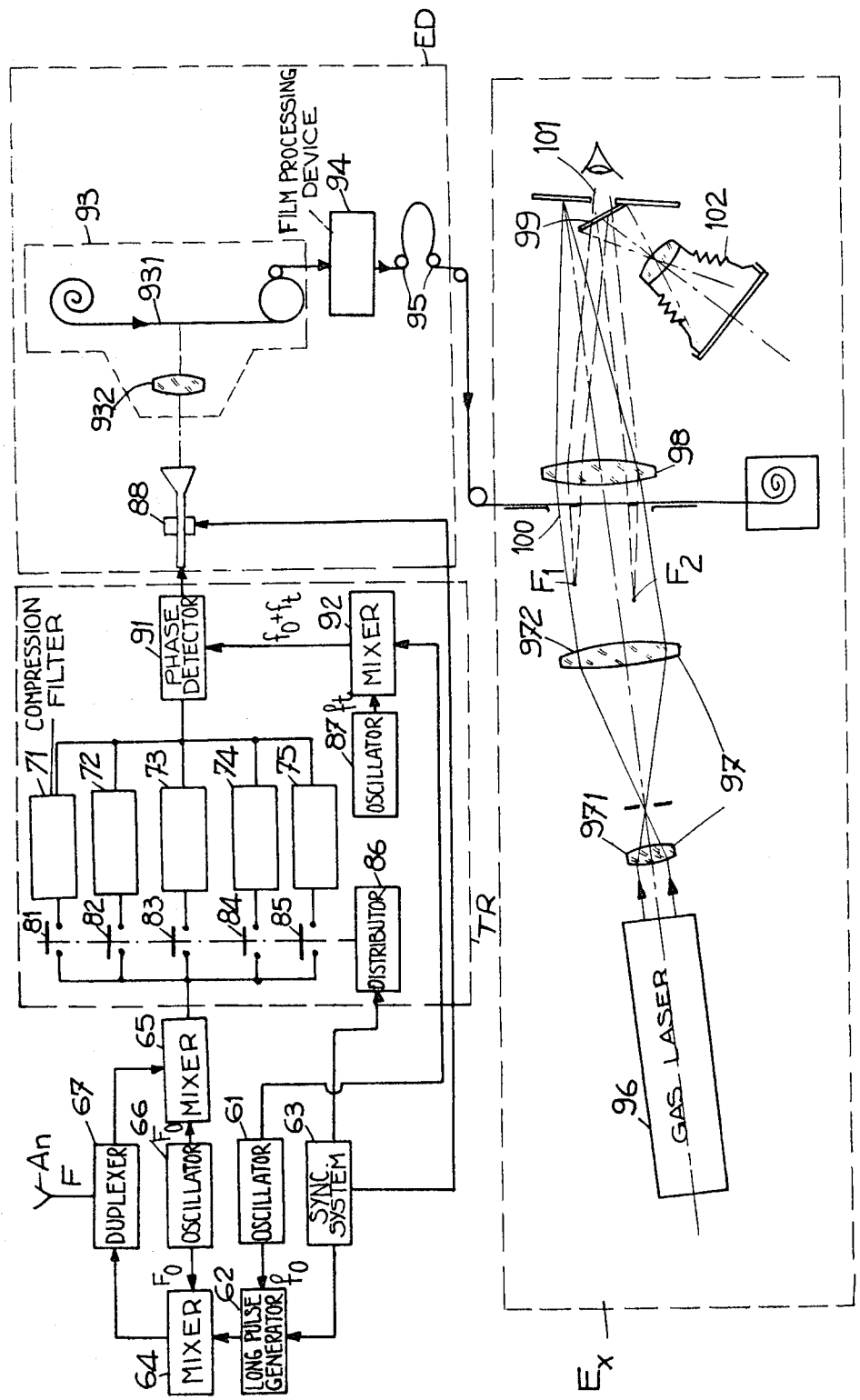
FIG. 6 is a general diagram of a radar equipment containing an optical processing system in accordance with the invention.

In FIG. 6, by way of example, i $n$ has been assumed to be 5 and the filters, 71, 72, 73, 74 and 75 are coupled to the output of the mixer 65 through respective gates 81 to 85 which are opened in turn by the signals from the range channels, these signals likewise being supplied by the synchronizing device 63 to the distributor 86.

Of course, if the range of the detected targets comprises the distance $Y_{01}$, one of these filters is to be replaced by a mere connection line, the corresponding compression ratio being equal to unity.

The outputs of the filters are coupled to one of the inputs of a phase amplitude detector 91. The reference wave of frequency $f_0$ is preferably converted in the device 92 to the frequency $f_0 + f_t$ before being applied to the detector 91, the wave $f_t$ being supplied by the oscillator 87. This frequency translation process makes it possible to minimize the visual effect in the recording of the background of illumination due to the DC component which it is necessary to add to the signal output of the phase detector to translate the negative values thereof to positive values. IT It will readily be seen that the spot representing the echo will not be modified by merely offset parallel to OX by a shift proportional to $Y'_0$, as indicated in FIG. 5a, where the same references are used as in FIG. 4a and the axes OX and OY are assumed to be superimposed on those of FIG. 4a in order to show the offset in the OX-direction.

At the output of the detector 91, the echo is applied to a recording and developing arrangement ED, the recording section of which is identical to that used in the conventional systems employing optical correlation. Thus, the echo is applied to a cathode-ray tube 88, the horizontal scanning of which is synchronized by the general synchronizing system 63. The image of the spot is formed on the film 931 in a recording camera 93, the lens 932 of which has been illustrated schematically. The exposed film is fed to a high speed film processing device 94. At the latter's output, the film is taken to the optical analyzer EX. An assembly of rollers 95 can be provided in order to allow, for observation purposes, a temporary immobilization of a portion of the film, without interfering with the recording and developing cycle, the film forming then a loop.

The optical analyzer device, based upon the principle described hereinbefore with reference to FIG. 4b, uses in this embodiment a gas laser 96, a beam-expander device 97 formed by two lenses 971 and 972, a field lens 98 and a semitransparent plate 99. The film enters the aperture 100 where it is illuminated, through the assembly 96—97, by a plane monochromatic wave P' which, as shown in FIG. 5b, is inclined at an angle $\alpha$, whose magnitude and sign are such that this inclination compensates (as concerns the resultant divergent wave) for the shift due to the frequency translation ft; that is, the angle $\alpha$ is chosen so that, after passing through the film, only the axis X thereof is visible on the FIG., the plane wave P' gives rise to a divergent wave having its axis FI parallel to the optical axis y y' of the system, i.e. orthogonal to axis X, while the axis of the convergent resulting wave, IF' is deflected with respect to axis y y' by an angle substantially equal to $2\alpha$, the selected value of $\alpha$ applying to all the echoes. The field lens 98 makes it possible to direct to the observation diaphragm 101, of FIG. 6, delimited by G and G' FIG. 5b, all the light energy of the divergent wave, the latter being converted, through lens 98, into a divergent wave of focus $F_1$, all the points $F_1$ being observed through diaphragm 101 as the film passes along the aperture 100. The lens also makes it possible to focus the plane wave resulting from the illumination of the film, onto the point $F_0$ outside the diaphragm and displace to the point $Q_0$ likewise outside the diaphragm, the point of intersection of the axes of the convergent beams. The image of the map is the location of echo points such as $F_1$.

To targets located at the same ordinate X but at distinct radar ranges correspond distinct points $F_1$ observed in direction which are distinct but are all comprised in the same plane perpendicular to axis X.

The semitransparent plate 99 makes it possible simultaneously to carry out the photographic recording, at 102, of the real focus $F_2$ which is obtained from $F_1$ by reflection onto said plate.

Figure 5A:
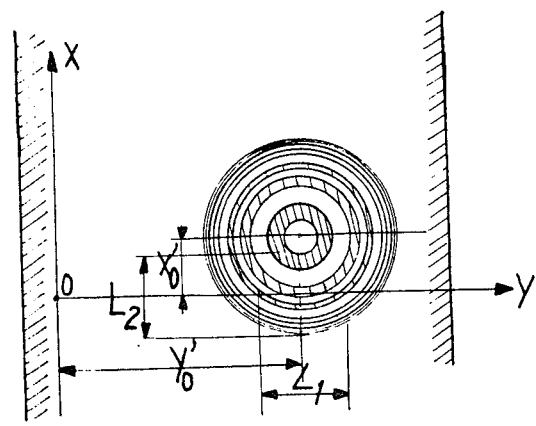
Figure 5B:
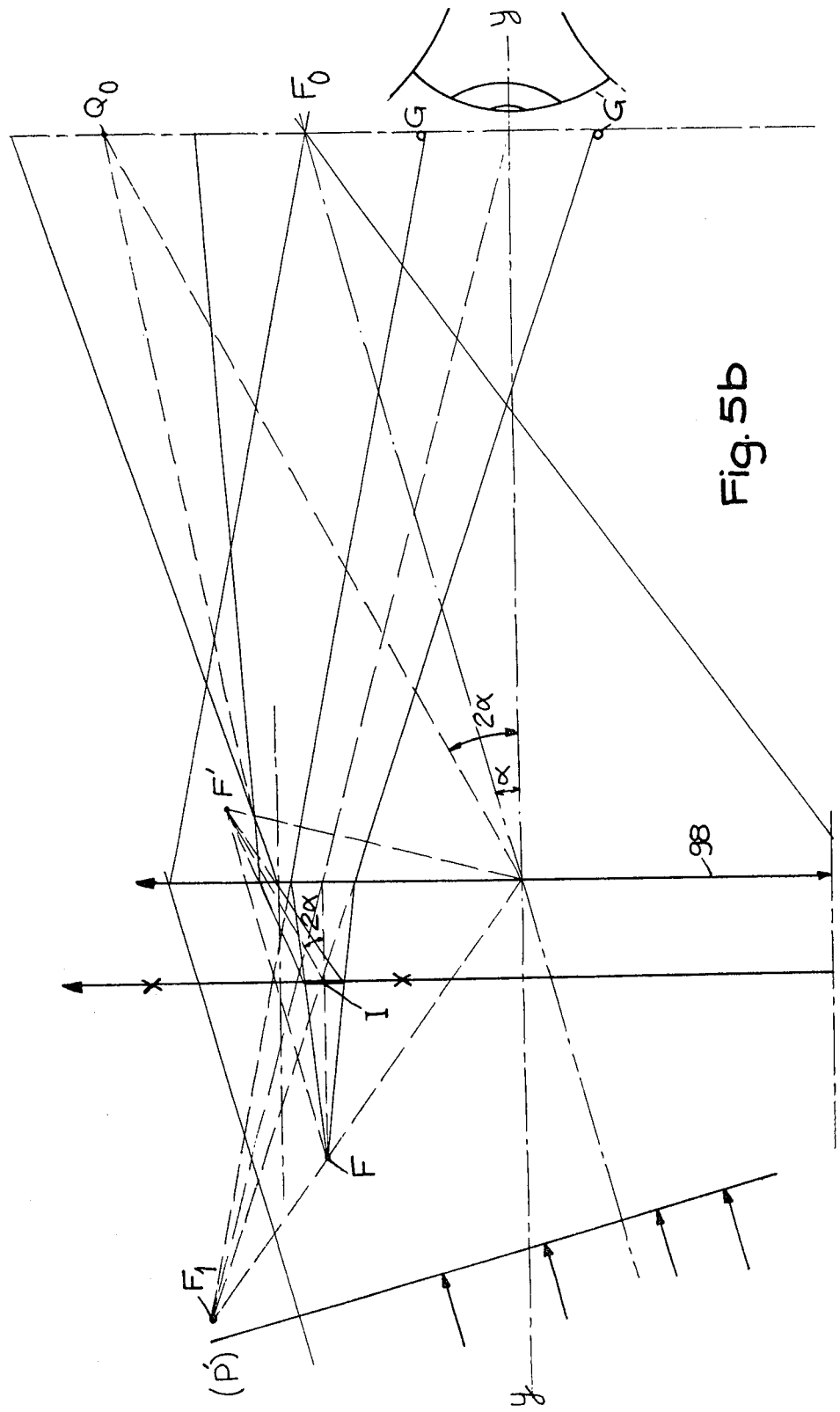

Because of the frequency ft, the pattern outlined in the diaphragm 100 and relating to an echo, is a portion of the rings of FIGS. 4a, 5a. in fact a portion obtained by cutting out in the film a rectangle symmetrical with respect to the axis OY for this target (FIG. 5a). The recording, which is effected, is some way intermediate of a photographic recording and a hologramme. As in the latter, the recordings of different points overlap one another and the illumination of only part of the recording with monochromatic light enables to the full image to be restored.

The limited number of compression filters means a loss in the brilliance of echoes which correspond to targets located near the limits of the various range intervals. The number $n$ chosen will depend upon the quality of definition required, upon the loss which can be accepted, and upon the width of tr terrain which the display is to cover. For example, for a loss of around 3 db and a 10 km. terrain width, considered in relation to a radar equipment operating at a wavelength of $\lambda = 3,4$ cm. $n$ will be around 20 for a definition of 3 meters and will drop to around 7 for a definition of 5 meters.

Of course, the invention is not limited to the embodiments described and shown which were given solely by way of example.

We claim:

1. A coherent linearly frequency modulated pulse detection system of the type comprising distance gates, a phase detection device coupled to said gates and having an output, scope means coupled to said output and synchronized with the distance gates, and means for recording the scope luminous signals on a moving film, wherein respective compression filters are respectively inserted between said gates and said phase detection device, the compression ratio of each filter having a predetermined algebraic value which is a function of the range of the distance gate to which it is coupled.

2. A detection system according to claim 1, further comprising: first means for lighting said film with a coherent plane wave, said plane being decomposed when traversing the recorded signals into a group of further plane waves, a group of respective convergent waves having respective real foci an and a group of respective divergent waves having respective virtual foci; and second means for observing the foci of one of said groups of waves.

3. A detection system according to claim 2, further comprising means for recording on a film the group of foci observed.

4. A detection system according to claim 2, wherein said group foci comprising the virtual foci, said system comprise means for shifting the nonobserved planes and convergent waves out of the vision field of the observation means.

Claim 5. A system according to claim 4, further comprising means for shifting by a constant value the frequency of the phase detected signals supplied to the scope means.

Claim 6. A system according to claim 5, wherein said coherent plane is inclined with respect to said film by an angle which is a function of said auxiliary frequency.